United States Patent [19]

Matsuda

[11] Patent Number: 5,703,861
[45] Date of Patent: Dec. 30, 1997

[54] INTEGRATED CONFOCAL OPTICAL PICK-UP HEAD WITH A HOLOGRAM AND A POLARIZER MOUNTED ON EACH SIDE OF A TRANSPARENT HEAT SINK

[75] Inventor: Osamu Matsuda, Kanagawa, Japan

[73] Assignee: Sony Corporation, Tokyo, Japan

[21] Appl. No.: 605,842

[22] Filed: Feb. 26, 1996

[30] Foreign Application Priority Data

Feb. 24, 1995 [JP] Japan ................ 7-037183

[51] Int. Cl.$^6$ ................ H01S 3/18; G11B 7/135
[52] U.S. Cl. ................ 369/110; 369/112; 369/122; 369/103
[58] Field of Search ................ 369/110, 109, 369/112, 44.12, 44.23, 122, 103, 13

[56] References Cited

U.S. PATENT DOCUMENTS

| | | | |
|---|---|---|---|
| 4,918,675 | 4/1990 | Lee | 369/13 |
| 5,231,620 | 7/1993 | Ohuchida | 369/44.14 |
| 5,406,543 | 4/1995 | Kobayashi et al. | 369/121 |
| 5,410,468 | 4/1995 | Horinouchi | 369/103 |
| 5,517,479 | 5/1996 | Nakanishi et al. | 369/109 |
| 5,568,463 | 10/1996 | Sahara et al. | 369/112 |

FOREIGN PATENT DOCUMENTS

| | | |
|---|---|---|
| A-0 348 950 | 1/1990 | European Pat. Off. . |
| A-0 550 036 | 7/1993 | European Pat. Off. . |
| A-0 565 052 | 10/1993 | European Pat. Off. . |
| A-0 581 519 | 2/1994 | European Pat. Off. . |

OTHER PUBLICATIONS

Patent Abstracts of Japan, vol. 017, No. 519 (P-1615), Sep. 17, 1993 & P-A-05 135420 (Sharp Corp.), Jun. 1, 1993.

*Primary Examiner*—Daid C. Nelms
*Assistant Examiner*—Kim-Kwok Chu
*Attorney, Agent, or Firm*—Hill, Steadman & Simpson

[57] ABSTRACT

Light is emitted from a light-emitting element toward an irradiated medium, and returning light reflected by the irradiated medium is diffracted by a hologram device. A polarizer polarizes the light diffracted by the hologram device to produce first polarized light that has passed through the polarizer and second polarized light that has been reflected by the polarizer. The first polarized light is detected by a first light-detecting element, and the second polarized light is detected by a second light-detecting element. A magnetooptical signal is generated as the difference between the intensities of the first and second polarized lights which are detected respectively by the first and second light-detecting elements.

7 Claims, 10 Drawing Sheets

INTEGRATED CONFOCAL OPTICAL PICK-UP HEAD WITH A HOLOGRAM AND A POLARIZER MOUNTED ON EACH SIDE OF A TRANSPARENT HEAT SINK

BACKGROUND OF THE INVENTION

1. Field of the Invention

The present invention relates to an optical device for detecting a magnetooptical signal, and more particularly to an optical device having a confocal laser coupler (CLC) device which is a novel optical coupling device.

2. Description of the Related Art

Some conventional optical devices, e.g., optical pickups for use with optical disks such as magnetooptical disks, compact disks, etc. have a polarizer such as a Wollaston prism, a polarizing beam splitter (PBS), or the like, and comprise various optical components assembled in a hybrid configuration. The conventional optical pickups have been complex in structure and large in size, and required a high degree of accuracy for alignment between some optical components to be combined in an optical arrangement.

SUMMARY OF THE INVENTION

It is therefore an object of the present invention to provide an optical device which has a relatively simple and small structure of optical components.

According to the present invention, there is provided an optical device comprising a substrate, a light-emitting element disposed on the substrate for emitting light toward an irradiated medium, a transparent plate coupled to the light-emitting element, a hologram device mounted on the transparent plate for diffracting light returning from the irradiated medium, a polarizer mounted on the transparent plate for polarizing the light diffracted by the hologram device to produce first polarized light that has passed through the polarizer and second polarized light that has been reflected by the polarizer, a plurality of light-detecting elements including a first light-detecting element disposed on the substrate for detecting the first polarized light, and a second light-detecting element disposed on the substrate for detecting the second polarized light, and means for generating a magnetooptical signal as the difference between the intensities of the first and second polarized lights detected respectively by the first and second light-detecting elements.

Light is emitted from the light-emitting element toward the irradiated medium, and returning light reflected by the irradiated medium is diffracted by the hologram device. The polarizer polarizes the light diffracted by the hologram device to produce first polarized light that has passed through the polarizer and second polarized light that has been reflected by the polarizer. The first polarized light is detected by the first light-detecting element, and the second polarized light is detected by the second light-detecting element. A magnetooptical signal is generated as the difference between the intensities of the first and second polarized lights which are detected respectively by the first and second light-detecting elements.

At the same time, a focusing error signal and a tracking error signal are generated based on output signals from the plurality of light-detecting elements.

The light-emitting element, the light-detecting elements, the hologram device, and the polarizer are combined into a relatively simple structure which results in a relatively simple and small optical structure.

DETAILED DESCRIPTION OF THE PREFERRED EMBODIMENT

An optical device according to the present invention includes an optical coupling device comprising a semiconductor laser as a light-emitting element and photodiodes as light-detecting elements, which are assembled in a monolithic configuration. Specifically, the present invention is applied to an optical pickup having a confocal laser coupler (CLC) device as an optical coupling device, for use with a magnetooptical disk.

The principles of the CLC device for use in the optical device according to the present invention will first be described below with reference to FIGS. 1 through 3.

Figure 1:
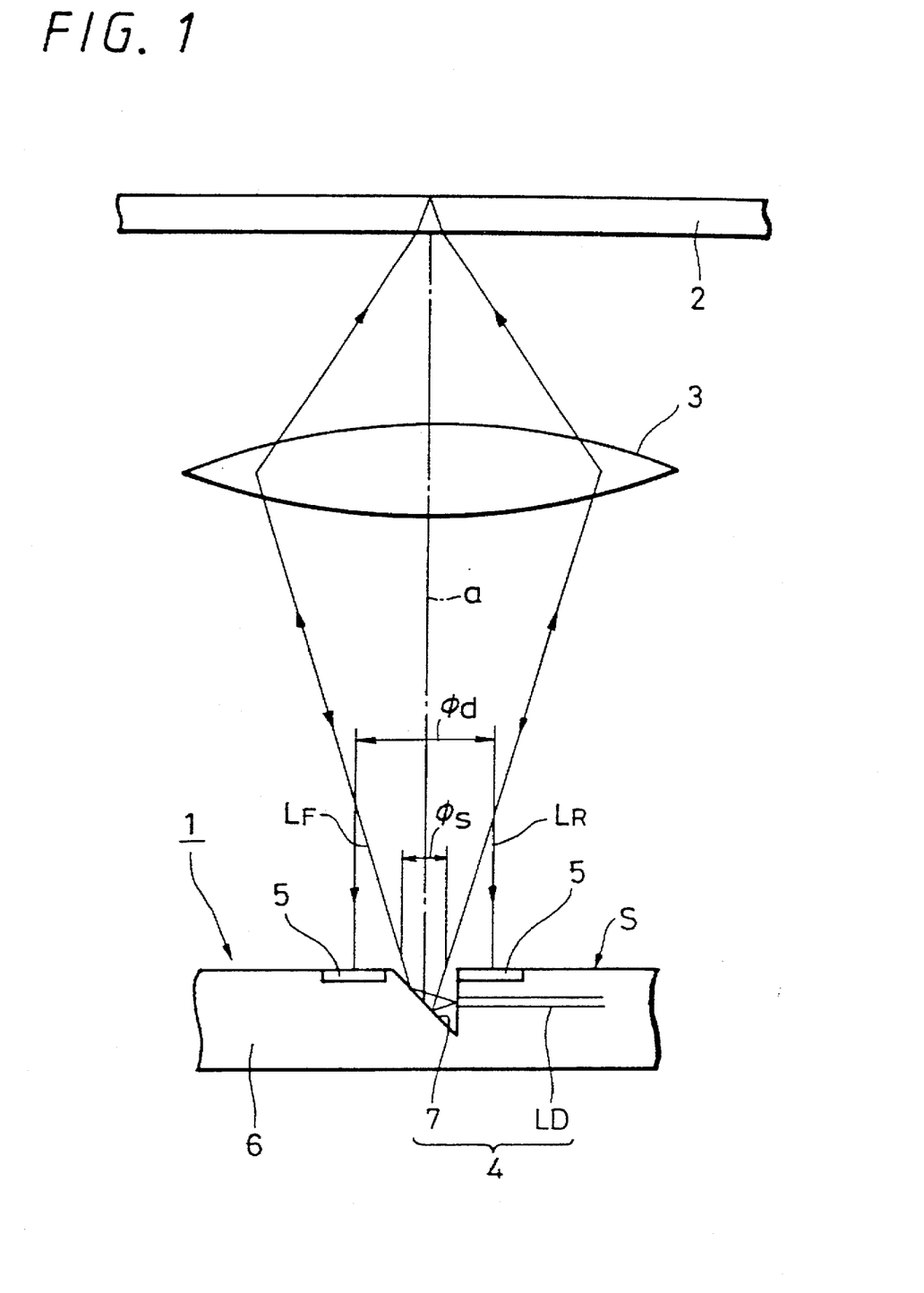
FIG. 1 is a schematic view illustrative of the principles of an optical coupling device in an optical device according to the present invention.

As shown in FIG. 1, an optical coupling device 1 is positioned in spaced relationship to an irradiated medium 2 such as an optical recording medium or the like with a light converging element 3, i.e., an optical condenser lens interposed therebetween.

The optical coupling device 1 comprises a light-emitting element 4 and a light-detecting element 5 which are integrally formed on a common semiconductor substrate 6. The light-emitting element 4 emits light $L_F$ which is converged onto the irradiated medium 2 by the condenser lens 3. Returning light $L_R$ reflected by the irradiated medium 2 is converged by the condenser lens 3 onto the light-detecting element 5 which is positioned at a confocal point of the condenser lens 3, more strictly, in the vicinity of the a confocal point of the condenser lens 3. With the illustrated arrangement, the light emitted from the light-emitting element 4 travels to the irradiated medium 2 and is reflected by the irradiated medium 2 in the same path along an optical axis indicated by the dot-and-dash line "a" through the condenser lens 3 before the light is detected by the light-detecting element 5.

Figure 3:
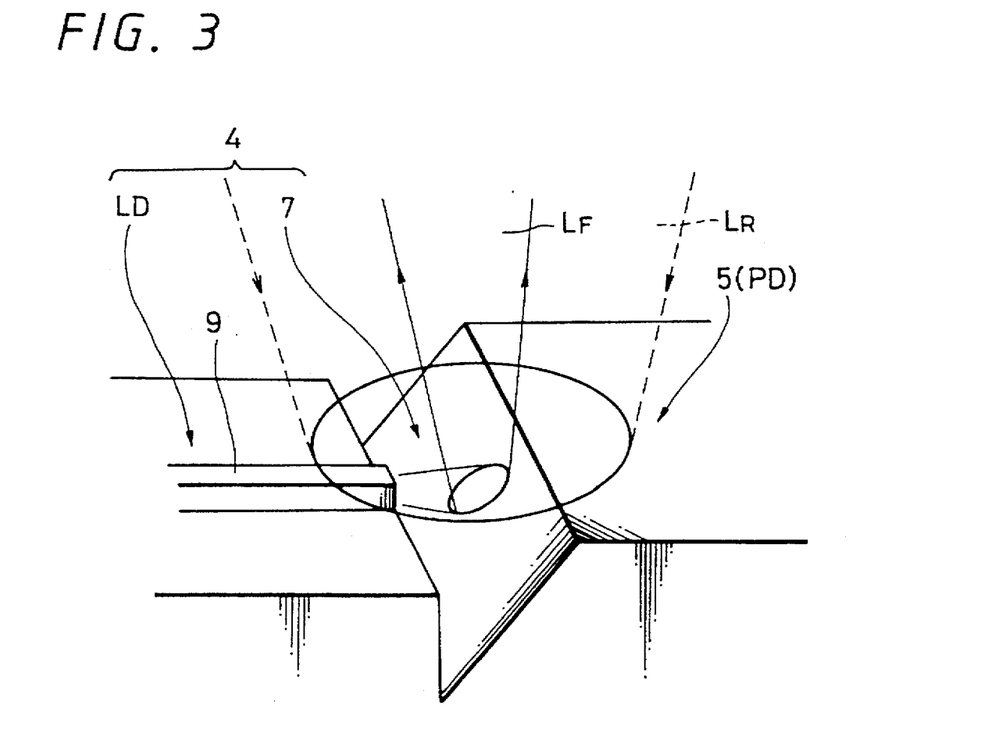
FIG. 3 is an enlarged fragmentary view of the optical coupling device.

As shown in FIG. 3 at an enlarged scale, the light-emitting element 4 comprises a semiconductor laser LD having a horizontal resonator with a stripe electrode 9 and a reflecting mirror 7, and the light-detecting element 5 comprises a photodiode PD. The light $L_F$ emitted by the semiconductor laser LD is reflected by the reflecting mirror 7 to travel in the path toward the irradiated medium 2.

The returning light $L_R$ returning from the irradiated medium 2 toward the light-detecting element 5 is converged as much as the diffraction limit of the condenser lens 3. At least the light-detecting surface of a portion of the light-detecting element 5 is positioned within the diffraction limit, i.e., at a location within the distance from the optical axis "a"

across a reference plane S in which the light-detecting element 5 lies, the distance being represented by $1.22\lambda/NA$ where $\lambda$ is the wavelength of the light $L_F$ emitted by the light-emitting element 4 and NA is the numerical aperture of the condenser lens 3.

Figure 2:
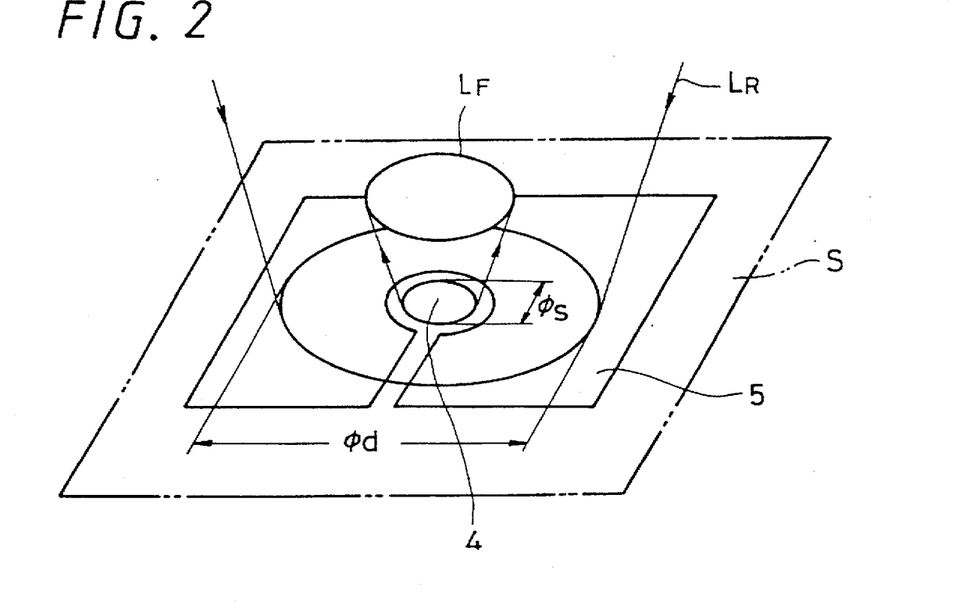
FIG. 2 is a perspective view of the optical coupling device.

As shown in FIGS. 1 and 2, the light $L_F$ emitted by the light-emitting element 4 has a diameter $\phi_s$ at the reference plane S, and the diffraction limit has a diameter $\phi_d$. The diameter $\phi_s$ is selected to be smaller than the diameter $\phi_d$, and the light-detecting element 5 has an effective light-detecting surface positioned outside of the diameter $\phi_s$. If the light-emitting element 4 comprises a semiconductor laser as shown, then the diameter $\phi_s$ of the light $L_F$ emitted thereby is in the range of about 1 to 2 µm. If the numerical aperture NA of the condenser lens 3 is in the range of from 0.09 to 0.1 on its optical coupling device 1 side, and the wavelength $\lambda$ of the emitted light is about 750 nm, then the diffraction limit, i.e., the diameter $\phi_d$ thereof, is represented by $1.22\lambda/NA \approx 10$ µm.

The light-emitting element 4 is positioned at one focal point of the condenser lens 3, and the irradiated medium 2, e.g., an optical disk, is positioned at a focal point thereof. The laser beam $L_F$ emitted from the semiconductor laser LD is reflected to travel substantially vertically by the reflecting mirror 7, and is applied through the condenser lens 3 to the irradiated medium 2. When the optical coupling device 1 is in a focused condition, the returning light reflected by the irradiated medium 2, i.e., the returning light $L_R$ which contains recorded information on the irradiated medium 2, travels back in the same path as the laser beam $L_F$, and is converged by the condenser lens 3 onto the photodiode PD positioned in the vicinity of the confocal point of the condenser lens 3. The returning light LR is detected by the photodiode PD and converted into an electric signal which is produced as a reproduced signal by the optical coupling device 1.

A process of fabricating the optical coupling device 1 will be described below by way of example with reference to FIGS. 4A, 4B, 4C, 4D, 4E, and 4F. In the example shown in FIGS. 4A through 4F, the optical coupling device 1 is fabricated according to selective metal-organic chemical vapor deposition (MO-CVD).

Figure 4A:
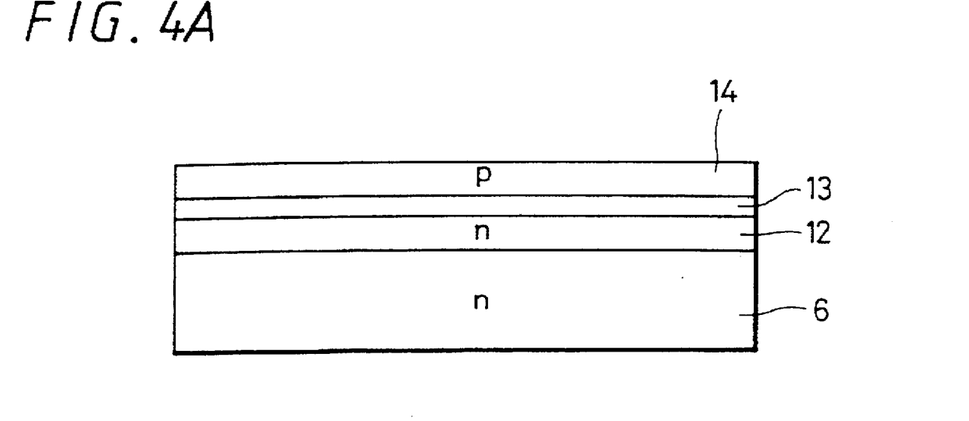
FIGS. 4A, 4B, 4C, 4D, 4E, and 4F are cross-sectional views of successive steps of a process of fabricating the optical coupling device.

As shown in FIG. 4A, semiconductor layers which make up a semiconductor laser are deposited by way of epitaxial growth on a gallium arsenide (GaAs) substrate 6 which has, as a principal surface, the (100) face of a first conductivity type, e.g., n type. Specifically, a first cladding layer 12 of aluminum gallium arsenide (AlGaAs) which is of the same conductivity type as the GaAs substrate 6, for example, an active layer 13 of GaAs, for example, and a second cladding layer 14 of AlGaAs which is of a second conductivity type, e.g., p type, different from that of the GaAs substrate 6, are successively epitaxially grown as laminated semiconductor layers according to MO-CVD.

Figure 4B:
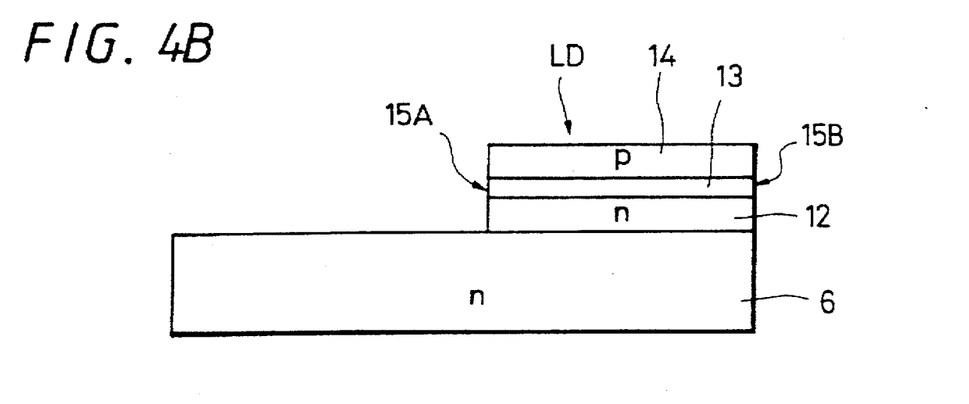

Then, as shown in FIG. 4B, the epitaxially grown semiconductor layers 14, 13, 12 are partly etched away in an area where a reflecting mirror will finally be formed, by reactive ion etching (RIE), leaving portions of the semiconductor layers 14, 13, 12 as a semiconductor laser LD. The portions of the semiconductor layers 14, 13, 12 which are left as the semiconductor laser LD have opposite end surfaces 15A, 15B, and serve as a horizontal resonator between the opposite end surfaces 15A, 15B. Although not shown, current blocking regions are formed by ion implantation or diffusion of impurities in sandwiching relationship to a region which will finally serve as the resonator of the semiconductor laser LD.

Figure 4C:
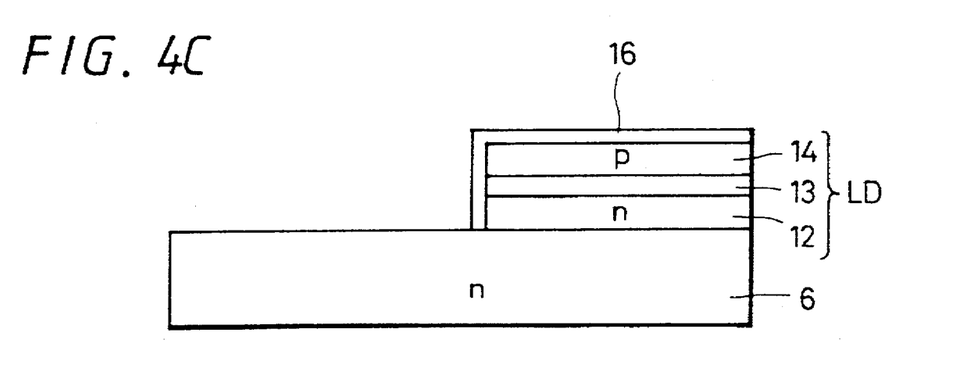

Thereafter, as shown in FIG. 4C, a mask layer 16 for selective MO-CVD, e.g., an insulating layer of silicon dioxide (SiO2), silicon nitride (SiNx), or the like, is deposited in covering relationship to the semiconductor layers 14, 13, 12, i.e., the semiconductor laser LD, left on the GaAs substrate 6.

Figure 4D:
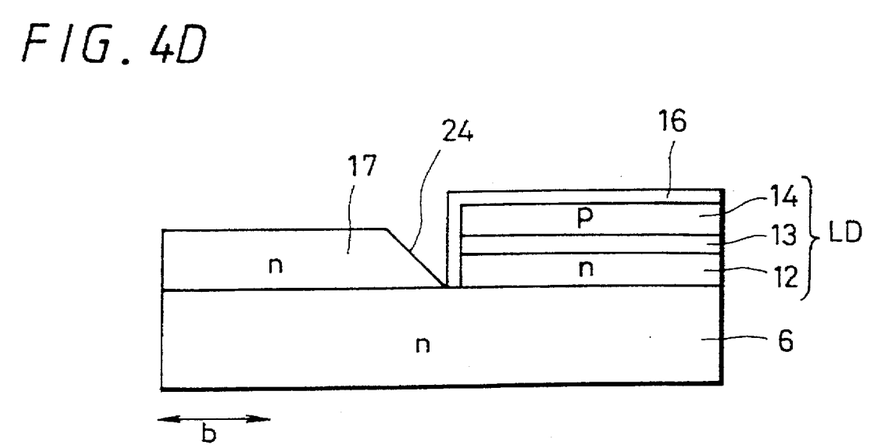

As shown in FIG. 4D, a first semiconductor layer 17 of GaAs which is of the first conductivity type, e.g., n type, is deposited on a portion of the GaAs substrate 6 which is not covered with the mask layer 16, by selective MO-CVD.

Figure 4E:
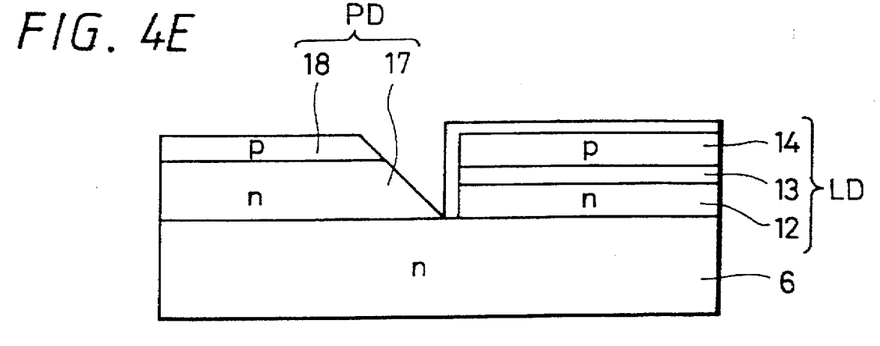

Then, as shown in FIG. 4E, a second semiconductor layer 18 of GaAs which is of second conductivity type, e.g., p type, is deposited on the first semiconductor layer 17 by selective MO-CVD. The first and second semiconductor layers 17, 18 serve as a photodiode PD. The second semiconductor layer 18 may be formed by ion implantation or diffusion rather than selective MO-CVD.

Figure 4F:
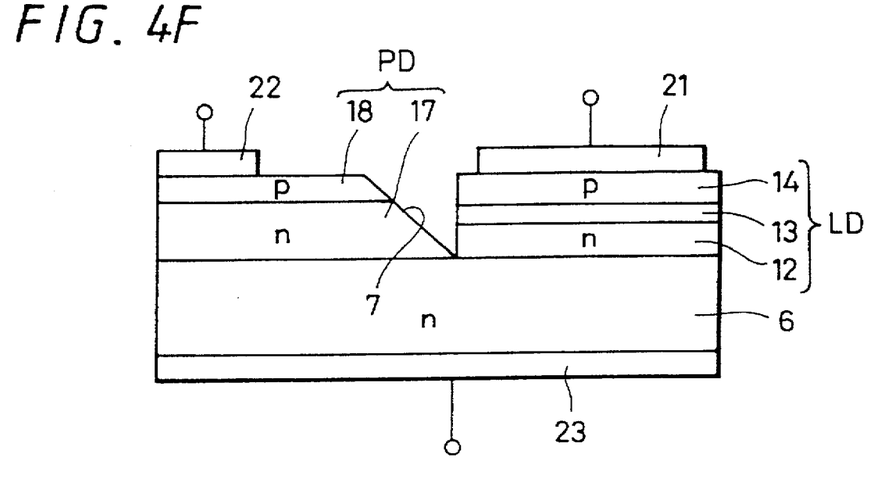

Thereafter, as shown in FIG. 4F, the mask layer 16 is etched away, and electrodes 21, 22 of the semiconductor laser LD and the photodiode PD are placed in ohmic contact with upper surface portions of the semiconductor laser LD and the second semiconductor layer 18. A common electrode 23 is also placed in ohmic contact with a lower surface of the GaAs substrate 6.

As shown in FIG. 4D, the first semiconductor layer 17 which is selectively epitaxially grown on the GaAs substrate 6 has a surface 24 which is a specified crystal face that confronts the end surface 15A of the semiconductor laser LD. For example, if the longitudinal direction of the horizontal resonator disposed between the end surfaces 15A, 15B of the semiconductor laser LD is the [011] direction, i.e., the direction indicated by the arrow "b" in FIG. 4D, then the surface 24 is produced as a slanted surface which is the (111)A face. If the longitudinal direction of the horizontal resonator is the [0–11] direction, then the surface 24 is produced as a slanted surface which is the (111)B face. At any rate, the surface 24 is inclined at 54.7° to the plane of the GaAs substrate 6. If the direction indicated by the arrow "b" is the [100] direction, the surface 24 is produced as the (110) face and inclined at 45° to the plane of the GaAs substrate 6. In each case, the surface 24 is formed as a molecular surface with good morphology.

The surface 24 which is a specified crystal face as described above serves as the reflecting mirror 7 for reflecting, in a given direction, the light LF emitted from the end surface 15A of the horizontal resonator of the semiconductor laser LD, as shown in FIG. 4F. Because the reflecting mirror 7 is formed as a crystal face, it has excellent mirror properties and is given an accurate gradient.

Figure 5:
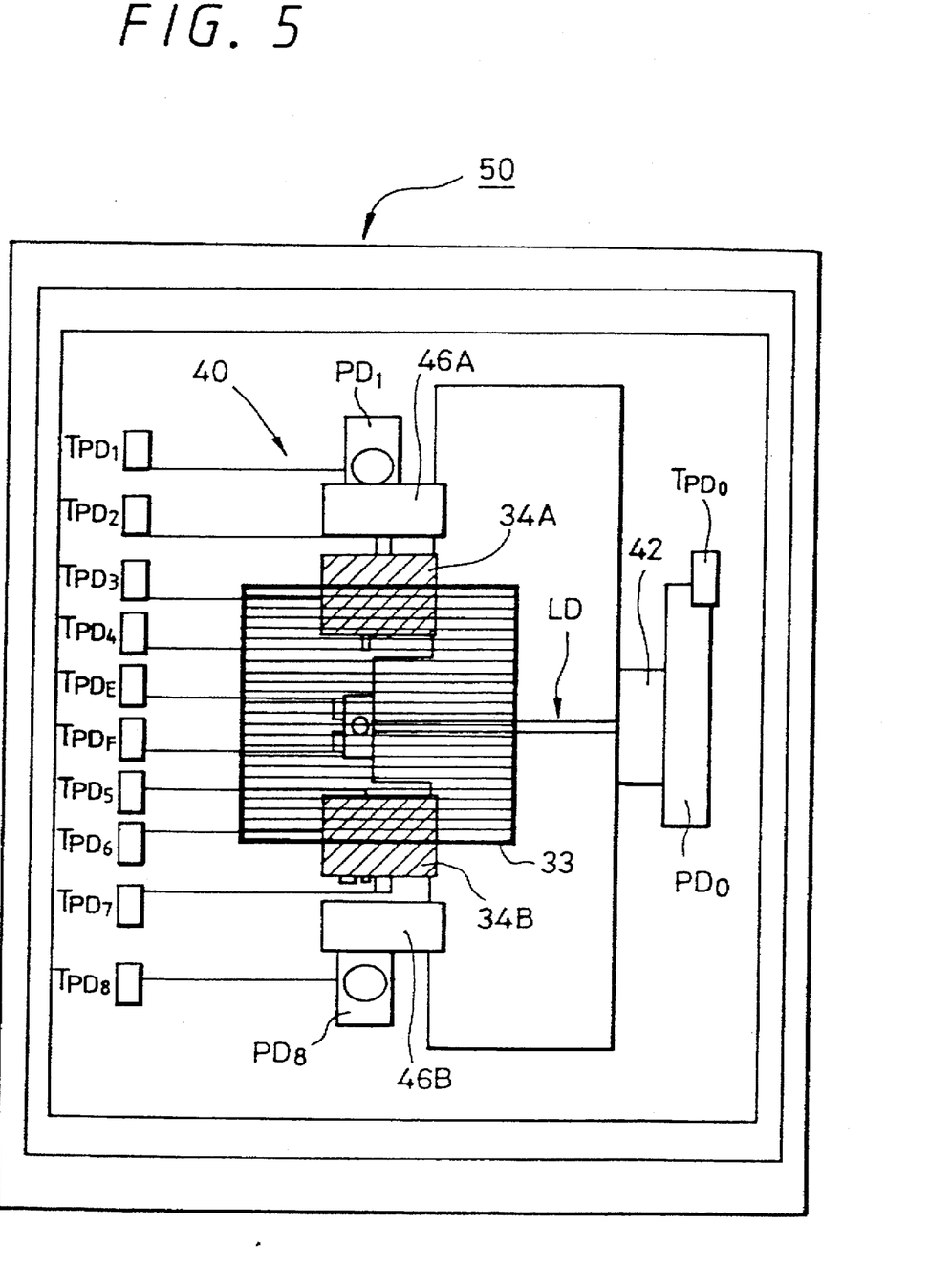
FIG. 5 is a plan view of the optical device according to the present invention.
Figure 6:
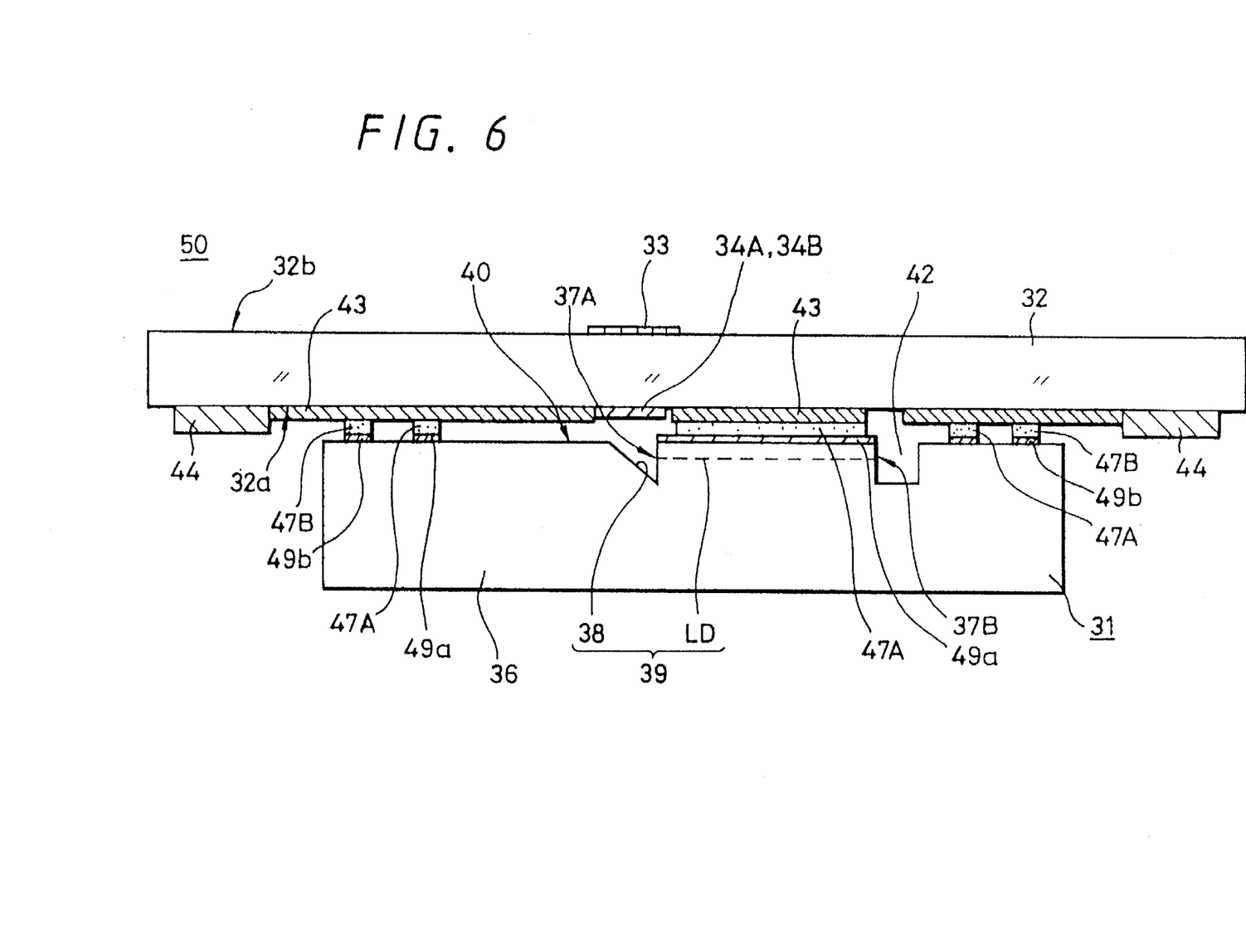
FIG. 6 is a cross-sectional view of the optical device.

As shown in FIGS. 5 and 6, an optical device according to the present invention comprises an optical coupling device 31 as the CLC device described above, a heat sink 32 disposed above the optical coupling device 31 and made of a material which is transparent, i.e., has a high transmittance, with respect to the wavelength of the light LF emitted by a semiconductor laser LD of the optical coupling device 31 and the returning light LR, and a hologram device 33 and a polarizer 34 which are mounted respectively on upper and lower surfaces of the transparent heat sink 32.

Figure 7:
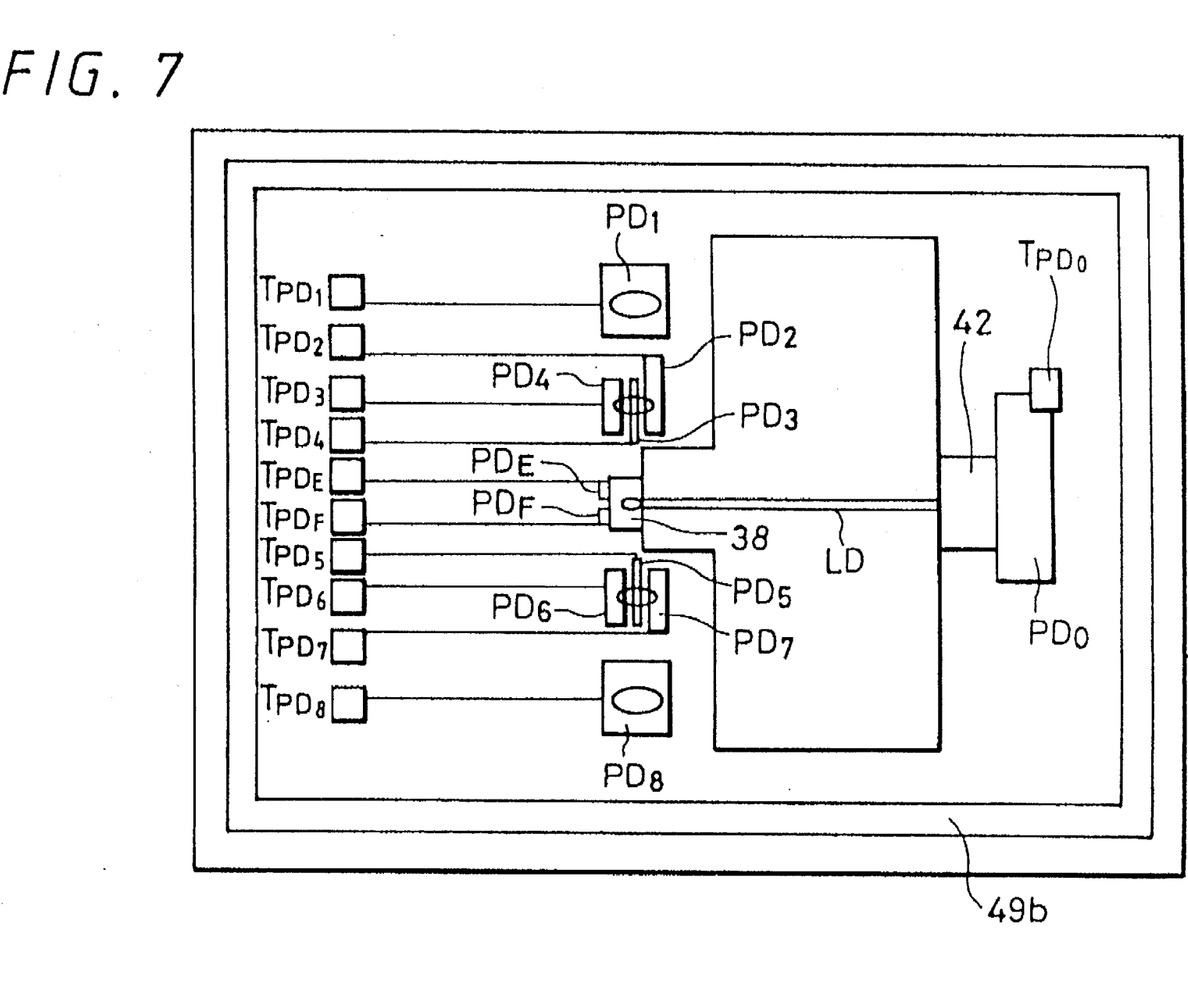
FIG. 7 is a plan view of an optical coupling device in the optical device.

As shown in FIGS. 5 through 7, the optical coupling device 31 comprises a light-emitting element 39 and a light-detecting element 40 which are formed in a monolithic configuration on a semiconductor substrate 36. The light-emitting element 39 comprises a semiconductor laser LD having a horizontal resonator and a reflecting mirror 38 disposed in confronting relationship to an end surface 37A of the horizontal resonator, for reflecting the light LF emitted from the end surface 37A. The light-detecting element 40 comprises a plurality of photodiodes $PD_0$, $PD_1$, $PD_2$, $PD_3$, $PD_4$, $PD_5$, $PD_6$, $PD_7$, $PD_8$, $PD_9$, $PD_E$, $PD_F$.

AS shown in FIG. 7, the pair of photodiodes PDE, PDF is positioned in the vicinity of a confocal point at the semiconductor layers near the reflecting mirror 38. The group of photodiodes $PD_2$, $PD_3$, $PD_4$ and the group of photodiodes PD5, PD6, PD7 are symmetrically positioned one on each side of the pair of photodiodes PDE, PDF along a direction normal to the longitudinal direction of the horizontal resonator. The photodiodes $PD_1$, $PD_8$ are also symmetrically positioned one on each side of the pair of photodiodes $PD_E$, $PD_F$ just outside of the group of photodiodes $PD_2$, $PD_3$, $PD_4$ and the group of photodiodes $PD_5$, $PD_6$, $PD_7$, respectively. The photodiode $PD_0$ is positioned on the semiconductor layers confronting an opposite end surface 38B of the horizontal resonator, and serves as a monitor photodiode for detecting light emitted backward from the end surface 38B thereby to monitor the output power of light emitted forward from the semiconductor laser LD.

The monitor photodiode PD0 is positioned across a groove 42 in the optical coupling device 31 from the semiconductor laser LD.

Terminals $T_{PDE}$, $T_{PDF}$, $T_{PD0}$, $T_{PD1}$, $T_{PD2}$, $T_{PD3}$, $T_{PD4}$, $T_{PD5}$, $T_{PD6}$, $T_{PD7}$, $T_{PD8}$ are connected respectively to the photodiodes $PD_E$, $PD_F$, $PD_0$, $PD_1$, $PD_2$, $PD_3$, $PD_4$, $PD_5$, $PD_6$, $PD_7$, $PD_8$.

The transparent heat sink 32 doubles as a package of the optical coupling device 31, a package window thereof, and a support board for the hologram device 33 and the polarizer 34. The transparent heat sink 32 is an important component for allowing the parts of the optical device to be assembled in a batch process.

The transparent heat sink 32 is required to be transparent with respect to the wavelength of the light emitted from the semiconductor laser LD and also the wavelength of the light returning to the light-detecting element 40. The transparent heat sink 32 may be made of sapphire, ruby, beryllia, diamond, silicon (Si), silicon dioxide ($SiO_2$), or the like. One of these materials may be selected which is most of the package, and other considerations. In this embodiment, the transparent heat sink 32 is made of sapphire.

The transparent heat sink 32 comprises a plate of sapphire having parallel lower and upper surfaces $32a$, $32b$. The surface $32a$ on which the optical coupling device 31 is mounted supports thereon wiring patterns 43 and electrode pads 44 connected to the wiring patterns 43 for outputting signals. The surface $32a$ also supports thereon polarizers 34A, 34B each comprising a wire grid, for example, at respective positions corresponding to the group of photodiodes $PD_2$, $PD_3$, $PD_4$ and the group of photodiodes $PD_5$, $PD_6$, $PD_7$. The surface $32b$ supports thereon the hologram device 33 at a position corresponding to a region which fully covers the pair of photodiodes $PD_E$, $PD_F$ and partly covers the group of photodiodes $PD_2$, $PD_3$, $PD_4$ and the group of photodiodes $PD_5$, $PD_6$, $PD_7$. Reflecting films 46A, 46B (see FIGS. 5 and 8) are disposed on the surface $32b$ one on each side of the hologram device 33. The wire grids of the polarizers 34A, 34B may be formed by metal evaporation and pattern etching, and may be of a structure as shown in Japanese patent application No. 6-340382. The hatching lines drawn in the polarizers 34A, 34B represent the direction of the wire grids.

The wiring patterns 43 may be made of an ordinary wiring material such as aluminum (Al), gold (Au), a transparent wiring material, or the like.

The optical coupling device 31 is joined to the transparent heat sink 32 by solder layers 47A, 47B with junction down such that the upper surface of the optical coupling device 31 from which the light is emitted by the semiconductor laser LD is held against the wiring patterns 43. The solder layers 47A are wiring solder layers, and the solder layers 47B are sealing solder layers disposed in an outer peripheral sealing region on the optical coupling device 31.

The semiconductor laser LD has electrodes $49a$ and the photodiodes $PD_E$, $PD_F$, $PD_0$–$PD_8$ have terminals $49a$, the electrodes $49a$ and the terminals $49a$ being held in contact with the solder layers 47A. Sealing metal layers $49b$ disposed in the outer peripheral sealing region on the optical coupling device 31 are held in contact with the solder layers 47B.

The optical device of the above structure shown in FIGS. 5 through 7 serves as an optical pickup 50.

A process of fabricating the optical coupling device 31 will be described below. The process of fabricating the optical coupling device 31 is essentially the same as the process of fabricating the optical coupling device 1 shown in FIG. 1.

Specifically, an n-type cladding layer, an active layer, and a p-type cladding layer, all made of an AlGaAs semiconductor material, are successively deposited on a semiconductor substrate of n-type GaAs or the like with its principal surface composed of the (100) face, by MO-CVD or the like.

Then, an insulating film of aluminum oxide ($Al_2O_3$), $SiO_2$, or the like is selectively formed by photolithography or the like on the p-type cladding layer in regions where the semiconductor laser LD and the monitor photodiode $PD_0$ will be like on the p-type cladding layer in regions where the semiconductor laser LD and the monitor photodiode $PD_0$ will be formed.

Then, using the insulating film as a mask, the end surfaces 37A, 37B of the horizontal resonator of the semiconductor laser LD and the end surface of the monitor photodiode $PD_0$ are produced by vertical anisotropic etching such as RIE.

Thereafter, a protective layer of $Al_2O_3$, $SiO_2$, or the like is deposited on the end surfaces of the semiconductor laser LD and the monitor photodiode $PD_0$. The reflecting mirror 38 is formed in confronting relationship to the end surface 37A of the horizontal resonator by crystal growth of a semiconductor material such as GaAs or the like according to MO-CVD.

If the longitudinal direction of the resonator of the semiconductor laser LD is the [010] direction, then the surface of the reflecting mirror 38 is formed as the (110) face which is inclined at 45° to the (100) face. If the longitudinal direction of the resonator is the [011] direction, then the surface of the reflecting mirror 38 is formed as the (111) face which is inclined at 54.7° to the (100) face. If the substrate is inclined at 9.7° from the (100) face to the [011] direction and the longitudinal direction of the resonator is the [011] direction, then the surface of the reflecting mirror 38 is inclined at 45° as the (111) face.

Finally, a pn junction or a pin junction is formed on the reflecting mirror 38 and other substrate surfaces to form respective positions. The light-detecting element 40 maybe fabricated by ion implantation, diffusion, crystal growth, or the like.

A process of fabricating the optical pickup 50 will be described below with reference to FIGS. 9A, 9B, 9C, 9D, and 9E.

Figure 9A:
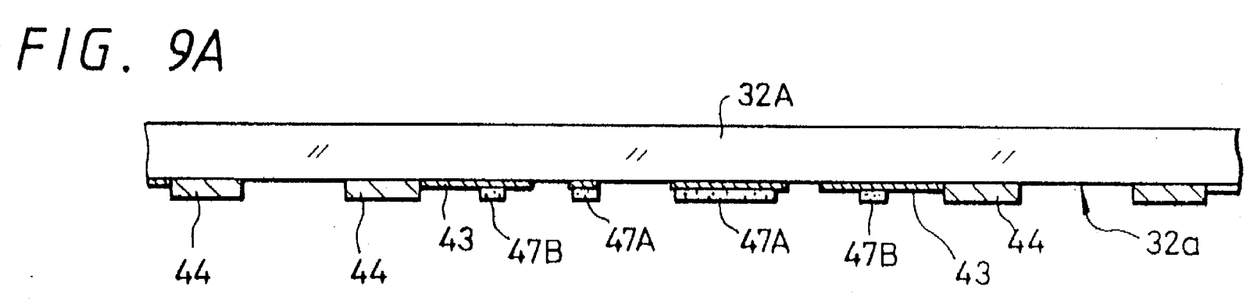
FIGS. 9A, 9B, 9C, 9D, and 9E are cross-sectional views of successive steps of a process of fabricating the optical device.

As shown in FIG. 9A, a transparent substrate 32A such as a sapphire substrate, which will be processed into the transparent heat sink 32, is prepared, and wiring patterns 43 as of Au and electrode pads 44 are formed on a surface 32a of a region of the transparent substrate 32A which will be the transparent heat sink 32. Then, solder layers 47A, 47B are formed on connecting and outer peripheral areas of the wiring patterns 43.

Figure 8:
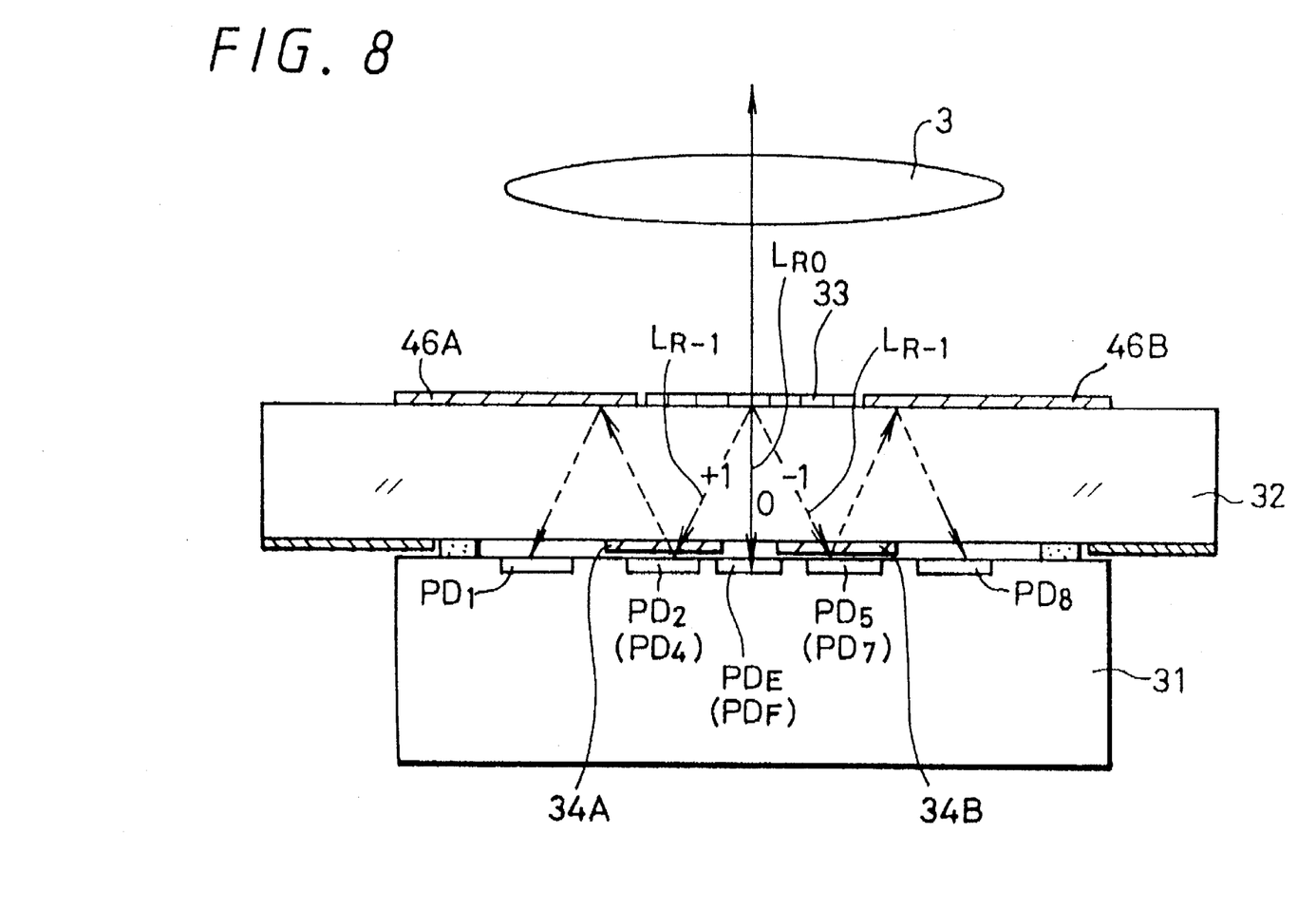
FIG. 8 is a cross-sectional view illustrative of the manner in which the optical device operates.
Figure 9B:
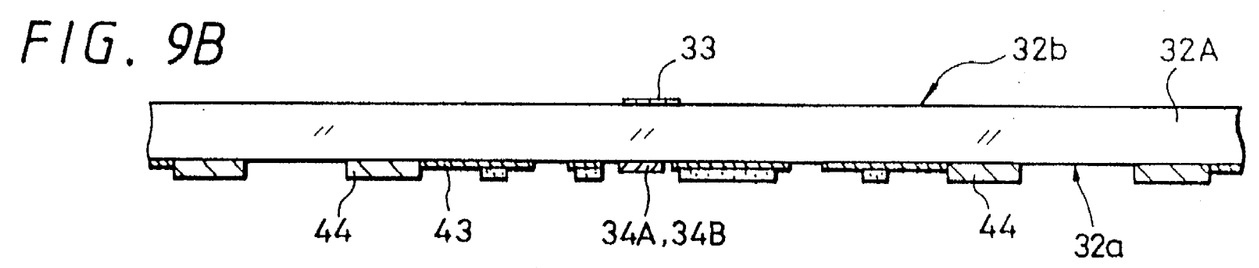

Then, as shown in FIG. 9B, polarizers 34A, 34B which comprise wire grids are formed on the surface 32a, and a hologram device 33 is formed on the surface 32b. Highly reflecting films 46A, 46B (see FIGS. 5 and 8) made of Au, Al, or the like are disposed on an opposite surface 32b of the transparent substrate 32A one on each side of the hologram device 33.

Figure 9C:
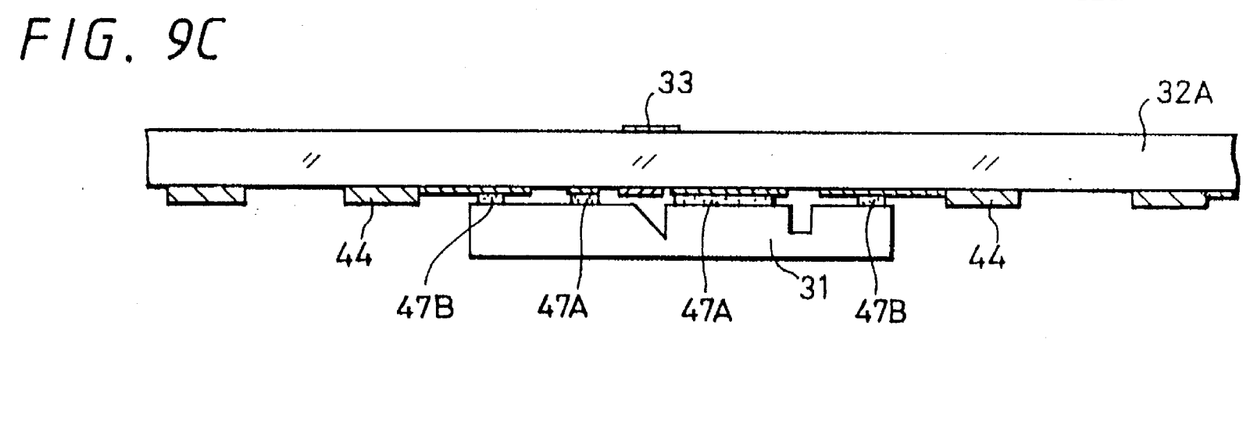

As shown in FIG. 9C, the optical coupling device 31 which has been fabricated as described above, is joined to the wiring patterns 43 on the transparent substrate 32A by the solder layers 47A, 47B with junction down. If necessary, the optical coupling device 31 is encased in a molded body of resin for protection from the ambient atmosphere.

Figure 9D:
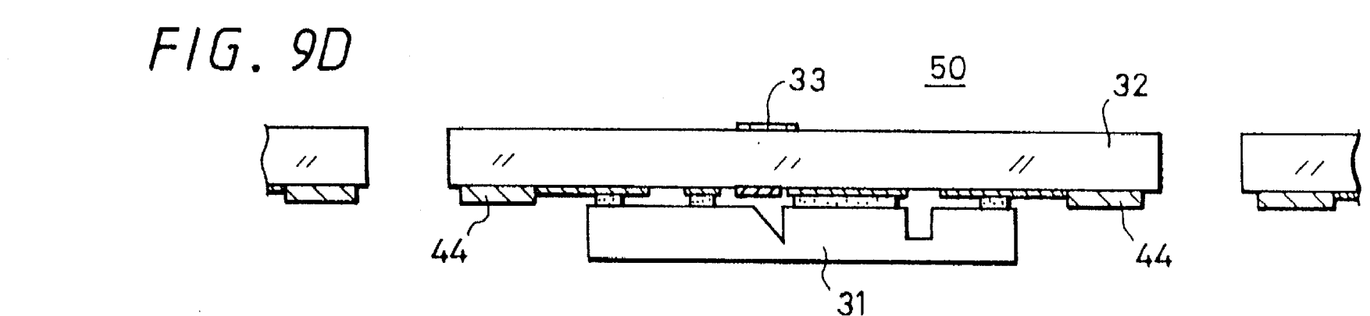

Thereafter, as shown in FIG. 9D, the transparent for protection from the ambient atmosphere.

Thereafter, as shown in FIG. 9D, the transparent substrate 32A is divided by dicing to separate the optical coupling device 31 from any other optical coupling devices on the transparent substrate 32A, thus producing the optical pickup 50 which is composed of the transparent heat sink 32 and the optical coupling device 31 that are integrally combined with each other.

Figure 9E:
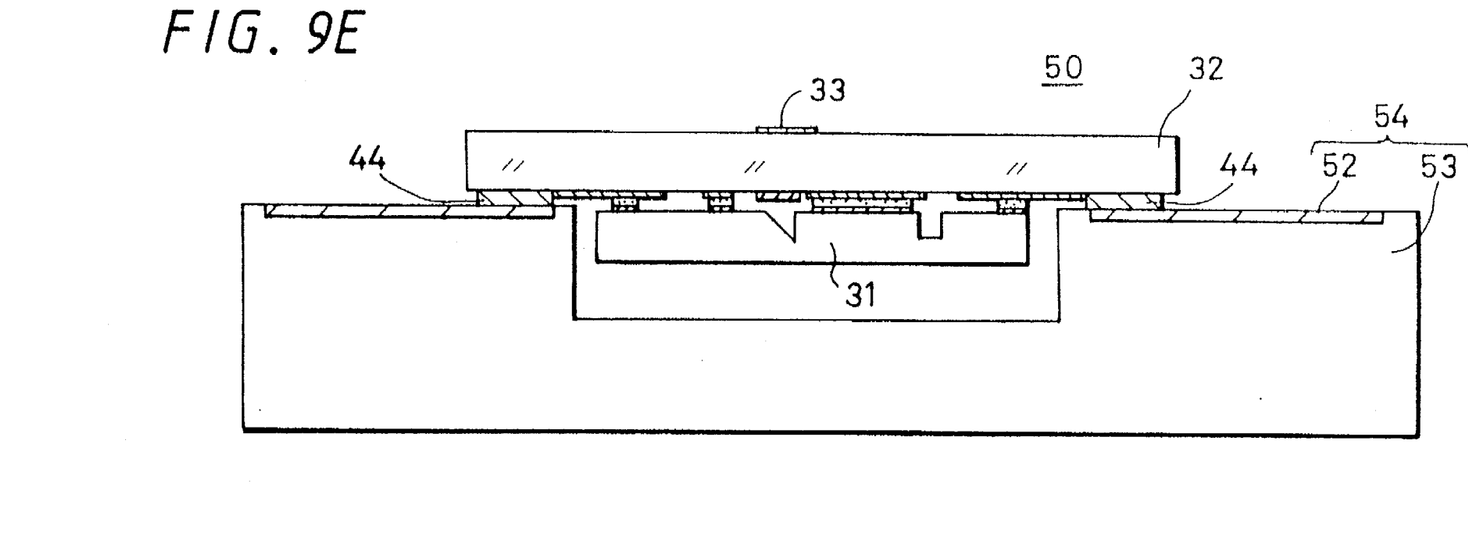

As shown in FIG. 9E, the electrode pads 44 of the optical pickup 50 are electrically and mechanically connected to a wiring board 54 which comprises an insulating board 53 and wiring patterns 52 formed thereon.

Operation of the optical pickup 50 will be described below with reference to FIG. 8.

As shown in FIG. 8, light emitted from the semiconductor laser LD of the optical coupling device 31 is reflected by the reflecting mirror 38 (see FIG. 6), and converged by a light converging element 3 such as an optical condenser lens onto an irradiated medium 2 (see FIG. 1) such as a magnetooptical disk. Returning light $L_{R0}$ of zero order which is reflected by the irradiated medium 2 is divided by the hologram device 33 into refracted light $L_{R+1}$ of +1st order and refracted light $L_{R+2}$ of −1st order.

The light $L_{R0}$ of zero order is applied to the photodiodes $PD_E$, $PD_F$ that are positioned in the vicinity of a confocal point of the condenser lens 3.

With respect to the refracted light $L_{R+1}$ of +1st order and the refracted light $L_{R-1}$ of −1st order, polarized lights which have passed through the polarizers 34A, 34B formed on the lower surface 32a of the transparent heat sink 32, are applied respectively to the group of photodiodes $PD_2$, $PD_3$, $PD_4$ and the group of photodiodes $PD_5$, $PD_6$, $PD_7$. Other polarized lights which have been reflected by the polarizers 34A, 34B are reflected respectively by the reflecting films 46A, 46B on the upper surface 32b of the transparent heat sink 32, and applied respectively to the photodiodes $PD_1$, $PD_8$.

Various signals are produced by the optical pickup 50 as follows:

A tracking error signal is generated as a differential signal $(PD_E-PD_F)$, i.e., a push-pull signal, which represents the difference between output signals from the photodiodes $PD_E$, PDF that are positioned in the vicinity of the confocal point. The differential signal $(PD_E-PD_F)$ is considered to be more intensive and stable against disk fluctuations, e.g., an out-of-focus condition, a skew, etc. than conventional far-field signals.

If a tracking error signal is generated in a far-field application, then it may be a signal $(PD_1+PD_2+PD_3+PD_4)-(PD_5+PD_6+PD_7+PD_8)$ which represents the difference between the sum of output signals from the photodiodes $PD_1$, $PD_2$, $PD_3$, $PD_4$ and the sum of output signals from the photodiodes $PD_5$, $PD_6$, $PD_7$, $PD_8$.

A focus error signal is generated as a differential concentric signal $(PD_2+PD_3-PD_4)+(PD_6+PD_7-PD_8)$ that is produced based on output signals from the photodiodes $PD_2$ through $PD_7$.

A magnetooptical signal (RF signal) is generated as a signal $\{PD_1-(PD_2+PD_3+PD_4)\}-\{PD_8-(PD_5+PD_6+PD_7)\}$ that is produced based on output signals from the photodiodes PD1 through $PD_8$ when P- and S-polarized lights are separated by the polarizers 34A, 34B based on their transmission and reflecting characteristics.

A signal detected by the monitor photodiode PD0 which is positioned in confronting relationship to the resonator end surface 37B opposite to the reflecting mirror 38 of the semiconductor laser LD is fed back or otherwise processed to adjust the output power of the light $L_F$ emitted by the semiconductor laser LD.

The tracking error signal may also be generated as a signal $(PD_1+PD_2+PD_3+PD_4)-(PD_5+PD_6+PD_7+PD_8)$ which is produced based on output signals from the photodiodes PD1 through $PD_8$.

The various signals described above may be generated based on output signals from either the photodiodes $PD_1$, $PD_2$, $PD_3$, $PD_4$ or the photodiodes $PD_5$, $PD_6$, $PD_7$, $PD_8$.

The formulas in the above parentheses represent the sum of or the difference between output signals from the corresponding photodiodes. In this way, the focusing servo and tracking servo processes can be effected similarly to a conventional optical pickup to produce an accurate magnetooptical signal (RF signal).

The optical pickup 50 according to the present invention offers various advantages as described below.

The optical pickup 50 is composed of the optical coupling device 31 which is of a flat monolithic structure and the transparent heat sink 32 which has the hologram device 33 and the polarizers 34A, 34B. This arrangement allows the optical system to be simplified in structure, reduced in size, have a flat configuration, and to be fabricated by a semiconductor batch process. The optical system can easily be adjusted.

The hologram device 33 needs only a fine angle adjustment, which can easily be achieved highly accurately through the package window of the transparent heat sink 32.

The hologram device 33 separates a portion of the optical path to reduce returning light directed toward the light-emitting end surface of the semiconductor laser LD for thereby lowering semiconductor laser noise.

Since the flat polarizers 34A, 34B are formed by a semiconductor fabrication process, the optical pickup 50 can produce a magnetooptical signal easily with a high S/N ratio.

The optical pickup 50 has a relatively simple optical arrangement for detecting a focusing error signal, a tracking error signal, and a magnetooptical signal.

Because light generated by the semiconductor laser LD is emitted outwardly through the transparent heat sink 32 serving as the package window, the thermal resistance of the semiconductor laser LD is reduced, making the semiconductor laser LD highly reliable and thermally stable.

As the wiring patterns 43 are formed on the transparent heat sink 32, the wires may be formed separately on the semiconductor chip and the transparent heat sink 32, making it possible to facilitate a multilayer wiring process which would otherwise be complex.

The optical pickup 50 has a package structure which is simpler than conventional optical pickups. Accordingly, the optical pickup 50 can be reduced in size and can be fabricated easily and inexpensively.

The solder seals in the optical pickup 50 provide moisture resistance for increased reliability. Since the number of locations where the solder is applied is small as a whole, the reliability of the optical pickup 50 is high.

The optical coupling device 31 and the transparent heat sink 32 are combined with each other into a small, lightweight optical pickup configuration.

The optical pickup 50 has a highly stable optical system and provides excellent playability. The tracking error signal produced at the optical coupling device 31 is highly stable.

The polarizers 34A, 34B which comprise wire grids may be replaced with polymeric polarizers that are coated or bonded.

While the polarizers 34A, 34B are shown as being formed on the lower surface of the transparent heat sink 32, they may be formed on the upper surfaces of photodiodes.

The monolithic structure of the optical coupling device 31 permits itself to be positioned easily with respect to the transparent heat sink 32.

The light-emitting element 4 is composed of the horizontal resonator laser and the reflecting mirror disposed in facing relationship to an end surface of the horizontal resonator laser. Accordingly, the light-emitting element 4 may be constructed as a surface-emission light-emitting element.

The optical device according to the present invention is suitable for use as an optical pickup for use with a magnetooptical disk, for example.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An optical head comprising:
   a light-emitting element having a top surface disposed on a substrate for emitting light toward an irradiated recording medium;
   a transparent heat sink coupled to said light-emitting element and attached on said top surface;
   a hologram device mounted on said transparent heat sink for diffracting light returning from the irradiated medium;
   a polarizer supported on said transparent heat sink for polarizing the light diffracted by said hologram device to produce first polarized light that has passed through said polarizer and second polarized light that has been reflected by said polarizer;
   a reflecting film attached on said transparent heat sink, while film reflects polarized light which travels inside said transparent heat sink;
   a plurality of light-detecting elements including a first light-detecting element disposed on said substrate for detecting said first polarized light, and a second light-detecting element disposed on said substrate for detecting said second polarized light; and
   means for generating a magneto optical signal as the difference between the intensities of the first and second polarized lights detected respectively by said first and second light-detecting elements.

2. An optical head according to claim 1, wherein said polarizer comprises a wire grid.

3. An optical head according to claim 1, wherein said light-emitting element comprises a horizontal resonator laser and a reflecting surface disposed in facing relationship to an end surface of said horizontal resonator laser.

4. The optical head of claim 1, wherein the heat sink is selected from the group consisting of sapphire, ruby, beryllia, diamond, silicon and silicon dioxide.

5. The optical head of claim 4, wherein the heat sink is made of sapphire.

6. The optical head of claim 1, wherein the heat sink has upper and lower parallel surfaces, and the hologram is supported on the upper parallel surface.

7. The optical head of claim 1, wherein a plurality of polarizers are supported on said heat sink.

* * * * *